(12) United States Patent
Tan

(10) Patent No.: US 9,587,963 B2
(45) Date of Patent: Mar. 7, 2017

(54) BRUSHLESS LINEAR ROTARY TRANSFORMER

(71) Applicant: Chengzhong Tan, Xiangtan (CN)

(72) Inventor: Chengzhong Tan, Xiangtan (CN)

( * ) Notice: Subject to any disclaimer, the term of this patent is extended or adjusted under 35 U.S.C. 154(b) by 0 days.

(21) Appl. No.: 14/427,637

(22) PCT Filed: Apr. 7, 2013

(86) PCT No.: PCT/CN2013/073778
§ 371 (c)(1),
(2) Date: Mar. 12, 2015

(87) PCT Pub. No.: WO2014/044043
PCT Pub. Date: Mar. 27, 2014

(65) Prior Publication Data
US 2015/0241248 A1    Aug. 27, 2015

(30) Foreign Application Priority Data
Sep. 21, 2012    (CN) .......................... 2012 1 0355872

(51) Int. Cl.
G01B 7/14    (2006.01)
G01B 7/30    (2006.01)
(Continued)

(52) U.S. Cl.
CPC .......... *G01D 5/2073* (2013.01); *G01D 5/2046* (2013.01); *H01F 38/18* (2013.01)

(58) Field of Classification Search
CPC ..... G01D 5/2073; G01D 5/2046; H01F 38/18
(Continued)

(56) References Cited

U.S. PATENT DOCUMENTS 3,273,096 A * 9/1966 Lipshutz ................. H01F 29/10
336/135
4,004,202 A * 1/1977 Davis ..................... H02K 29/12
318/400.37
(Continued)

FOREIGN PATENT DOCUMENTS

CN    201904201 A1    7/2011
CN    201904201 U *   7/2011
(Continued)

OTHER PUBLICATIONS

English Translation of CN 201904201U—Google, Nov. 30, 2010.*
(Continued)

*Primary Examiner* — Jermele M Hollington
*Assistant Examiner* — Sean Curtis
(74) *Attorney, Agent, or Firm* — Luoh J. Wu; Continent Patent Office LLP

(57) ABSTRACT

A brushless linear rotary transformer apparatus for determining angular position and velocity of a rotor includes a rotor, a stator, a primary coil winding, pairs of secondary coil windings, bearings, an excitation power supply, and a signal receiving and processing system. The primary coil winding is wrapped around a hollow cylinder body on one end of the stator. One end of the rotor shaft is arranged in the hollow cylinder body. Another ends of the rotor shaft and the stator are connected by a bearing. Pairs of secondary coil windings are embedded in the stator and on the inner side of the stator. An alternating magnetic field is generated by the excitation power supply through the primary coil winding. The amplitudes of the induced electromotive force at the ends of the secondary coil windings are linearly proportional to the angular position of the rotor. The signal receiving and processing system samples and processes the signals of the electromotive forces from the secondary coil winding, and outputs the parameters concerning the angular position, the
(Continued)

angular velocity, and the rotation number of the rotor. The brushless linear rotary transformer has advantages of simple and reliable structure, which can be applied to measure the angular displacement and the angular velocity in multiple turns.

6 Claims, 3 Drawing Sheets

(51) Int. Cl.
*H01F 5/00* (2006.01)
*G01D 5/20* (2006.01)
*H01F 38/18* (2006.01)

(58) Field of Classification Search
USPC .......................... 324/207.16, 207.24, 207.25
See application file for complete search history.

(56) References Cited

U.S. PATENT DOCUMENTS

| | | | | |
|---|---|---|---|---|
| 4,117,519 A * | 9/1978 | Shioyama | ................. | G11B 5/52 310/268 |
| 4,503,377 A * | 3/1985 | Kitabayashi | ......... | H02K 11/048 310/112 |
| 4,556,886 A * | 12/1985 | Shimizu | .................... | G01B 7/02 324/166 |
| 4,604,575 A * | 8/1986 | Shimizu | ................. | G01D 5/243 318/653 |
| 4,612,503 A * | 9/1986 | Shimizu | ................. | G01D 5/243 324/162 |
| 4,628,499 A * | 12/1986 | Hammett | .............. | F15B 11/048 318/599 |
| 4,695,795 A * | 9/1987 | Nakamizo | ................ | G01P 3/487 324/174 |
| 4,754,220 A * | 6/1988 | Shimizu | ................. | G01D 5/243 324/207.18 |
| 4,755,751 A * | 7/1988 | Ray | ......................... | H02K 24/00 318/661 |
| 5,939,878 A * | 8/1999 | Dong | ................. | G01D 5/2046 324/207.17 |
| 6,356,472 B1 * | 3/2002 | Runkle | .................... | H01F 38/18 323/348 |
| 6,563,412 B2 * | 5/2003 | Paris | ........................ | H01F 21/06 310/260 |
| 6,864,648 B1 * | 3/2005 | Stedman | ................. | H02K 99/20 310/112 |
| 6,864,808 B2 * | 3/2005 | McBrien | .............. | G01D 5/2291 318/657 |
| 7,019,514 B2 * | 3/2006 | Tabrizi | ..................... | G01D 5/04 324/207.18 |
| 7,911,307 B2 * | 3/2011 | Mast | ........................ | H01F 38/18 336/130 |
| 8,179,126 B2 * | 5/2012 | Li | ........................... | G01D 5/145 324/207.2 |
| 9,222,804 B2 * | 12/2015 | Hosek | .................. | G01D 5/2266 |
| 2005/0273295 A1 * | 12/2005 | Ito | ............................ | B62D 6/10 702/151 |
| 2007/0040642 A1 * | 2/2007 | Mast | ....................... | H01F 38/18 336/180 |
| 2009/0066324 A1 * | 3/2009 | Nagamoto | ........... | G01D 5/2073 324/207.25 |
| 2009/0108782 A1 * | 4/2009 | Klatt | ....................... | B60Q 1/30 318/400.17 |
| 2009/0115408 A1 * | 5/2009 | West | .................... | G01D 5/2046 324/207.25 |
| 2009/0205520 A1 * | 8/2009 | Schafer | ................... | B41F 13/26 101/216 |
| 2010/0207475 A1 * | 8/2010 | Kawasaki | ........... | G01D 5/2046 310/156.08 |
| 2011/0040519 A1 * | 2/2011 | Yeh | .......................... | H02P 6/16 702/145 |
| 2011/0267041 A1 * | 11/2011 | Li | .......................... | G01D 5/145 324/207.2 |
| 2011/0285387 A1 * | 11/2011 | Andrae | .................. | G01D 5/147 324/207.25 |
| 2012/0313565 A1 * | 12/2012 | Ortman | ................ | G01D 5/2073 318/611 |
| 2013/0057263 A1 * | 3/2013 | Hosek | .................. | G01D 5/2266 324/207.18 |
| 2013/0104409 A1 * | 5/2013 | Hamilton | ............... | G01C 19/38 33/324 |
| 2013/0193957 A1 * | 8/2013 | Zhou | .................... | G01D 5/2046 324/207.16 |
| 2014/0312885 A1 * | 10/2014 | Vellaiyanaicken | .. | G01D 5/2046 324/207.25 |
| 2014/0361792 A1 * | 12/2014 | Nakamura | ........... | G01D 5/2073 324/655 |
| 2015/0241248 A1 * | 8/2015 | Tan | ........................ | H01F 38/18 324/207.16 |
| 2015/0253153 A1 * | 9/2015 | Smithanik | ............ | G01D 5/2013 324/207.25 |
| 2015/0309489 A1 * | 10/2015 | Prata | ....................... | H02J 13/00 700/11 |

FOREIGN PATENT DOCUMENTS

| | | |
|---|---|---|
| CN | 102930966 A1 | 2/2013 |
| CN | 202816634 A1 | 3/2013 |
| JP | 2012164734 A1 | 8/2012 |

OTHER PUBLICATIONS

Moog, Rotary Variable Differential Transformer (RVDT), www.moog.com/components, Wayback date: Jun. 24, 2012.*
Written Opinion of the ISR, PCT/CN2013/073778, related to current U.S. Appl. No. 14/427,637 dated Nov. 7, 2013.*

* cited by examiner

BRUSHLESS LINEAR ROTARY TRANSFORMER

BACKGROUND OF THE INVENTION

The present invention relates to a brushless linear rotary transformer. The a brushless linear rotary transformer commonly used as a sensor to determine angular position and velocity of an output shaft, and applied in servo control systems. The disclosed sensor can also be used in coordinate transformation, triangle operation, transmission of angle data, and in measurement of the displacement of a vibrating body.

As angular position sensor, the rotary transformer is widely used in servo control system. In addition to rotary transformer, the optical and magnetic encoders are also used to determine angular position of an output shaft. The optical encoder converts angular displacement of the rotating shaft into the digital pulse signals. According to the lithography method and output signal, the optical encoders are further divided into incremental and absolute encoders. Incremental encoder has the advantage of simple structure, being able to give information of angular position in the incremental manner. Yet this kind of optical encoder is failed to indicate the initial angular position. Absolute encoder directly provides the absolute angular position of an output shaft. However, absolute encoder has complex structure. Applications using optical sensor devices are technology limited with regard to accuracy, tend to be expensive, and sensitive to environmental conditions, and can be corrupted by opaque contamination. Due to the fragility of glass, optical encoder can not be applied to determine high angular velocity.

Magnetic sensor is another kind of apparatus used to determine angular position of an output shaft, which operates by changing magnetic pole. Applications using magnetic sensor devices are limited by poor accuracy.

The rotary transformer is a kind of electromagnetic induction sensor used to determine angular position of an output shaft. Prior rotary transformer for sensing the angular position and velocity includes a rotor, a stator, and pairs of inductive coils. The coils mounted in the stator are the primary coil windings, which are connected to receive the excitation signals, whereas the coils wrapped around the rotor are the secondary coil windings, which output the induced electromotive forces. The rotary transformer has the simple and reliable structure, which is particularly applicable in harsh environment that other kinds of sensors fail to work.

According to signal output manner from the coil winding wrapped around the rotor, the rotary transformers used to determine angular position are divided into rotary transformer with brush, wherein the signals from the coils wrapped around the rotor are output through slip ring and brush, and brushless rotary transformer. Applications of the rotary transformer with brush are subject to wear, friction, and vibration.

Prior brushless rotary transformer has two different configurations, one is toroidal type transformer and the other is reluctance type transformer. In prior toroidal transformer, a coil winding wrapped around the stator and a coil winding wrapped around the rotor are concentrically arranged and electrically connected. Signal input and output are performed by the toroidal transformer. In prior reluctance type transformer, both excitation winding and output winding are embedded within the same set of slot distributed in the stator. Signals at excitation winding and output winding are sine and cosine functions of the angular position of a rotating shaft, with a phase shift of 90 degrees. Special design and processing are required for manufacturing the magnetic pole of the rotor in prior reluctance type transformer, so that the magnetic field in an air gap between stator and rotor is the sine or cosine function of the angular position of the rotor. Applications using prior brushless transformers are technology limited with regard to complex mechanical structure and difficulty in manufacture.

The relative position of the primary coil winding and the secondary coil winding is changed with angular displacement of the rotor in prior devices. The relation between an amplitude of the signal at secondary coil winding and the angular position of the rotor is a sine or cosine function, or a linear function in a restricted range of the angular position. Applications of single pole rotary transformer are limited by poor accuracy. In order to improve measurement precision, a plurality of pairs of magnetic poles are usually embedded in prior rotary transformer, which inevitably increases the complexity and reduces the reliability of the device.

The primary coil winding in prior device outputs two orthogonal analog signals, whose amplitudes are sine and cosine functions of the angle of the angular position of the rotor. In order to obtain the angular position of the output shaft, it is necessary to design and fabricate particular and expensive electrical circuits for modulating and demodulating signals. Particular integrating circuits, such as AD2S1200, AD2S1205, and AD2S1210 fabricated by Advanced Micro Devices, Inc., are usually needed. Applications of prior art devices are limited by poor accuracy and high price.

Accordingly, a need remains for a reliable and accurate angular position sensing device of improved manufacturability, operating performance, and simplified signal treatment.

The present invention provides a brushless linear rotary transformer, which can overcome the limitations of prior art devices for sensing the angular position. The apparatus of the present invention has the advantages of simple and reliable structure, with strong anti-interference ability. No particular and expensive circuit is needed in the present invention for modulating and demodulating signals. The apparatus of the present invention can be used to accurately determine the angular position and velocity of an output shaft in multiple turns.

BRIEF SUMMARY OF THE INVENTION

Briefly stated, the present invention provides a brushless linear rotary transformer apparatus for sensing the angular position an output shaft. The apparatus of the present invention comprises a rotor, a stator, a primary coil winding, pairs of the secondary coil windings, a bearing, an excitation power supply, and a signal receiving and processing system. The primary coil winding is wrapped around a hollow cylinder body on one end of the stator. One end of the rotor shaft is arranged in the hollow cylinder body. Another ends of the rotor shaft and the stator are connected by the bearing. Pairs of the secondary coil windings are embedded in the stator and on the inner side of the stator. An alternating magnetic field is produced by the excitation power supply through the primary coil winding, and the induced electromotive forces at the ends of the secondary coil windings are associated with the angular position of the rotor. The signal receiving and processing system samples and processes the signals from the secondary coil windings, and outputs the parameters concerning the angular position, the angular velocity, and the rotation number of the rotor.

The rotor in the present invention is in a shape of an axially symmetrical cam with two parallel planes, or in an axially symmetrical shape of multiple gears. Uniform air gaps are arranged between the two adjacent rectangular secondary coil windings, and the groove shape air gaps are uniformly distributed on inner side of the stator and parallel to the axis of the stator. The rotor and the stator consist of ferromagnetic material. One end of the rotor shaft is magnetically connected with the stator through the hollow cylinder body on one end of the stator. Another ends of the rotor and the stator are connected by a non ferromagnetic bearing. Hence the rotor and the stator on these ends are magnetically separated with large reluctance. The primary coil winding is wrapped around a hollow cylinder body, and the magnetic flux induced by the primary winding is conducted through the hollow cylinder and the rotor to the stator. Hence the apparatus of the present invention is in fact a shell type transformer.

In the present invention, the excitation current is either an alternating current at 50 or 60 Hz, or a high frequency alternating current generated inversely from a direct current. The magnetic flux induced by an excitation current forms the circulations across the planes of the secondary coil winding. When the rotor rotates, the inductance of one coil winding increases while the inductance of the other coil windings decreases to provide an indication of rotational position of the rotor. The signal receiving and processing system samples and processes the signals from the secondary coil winding, and outputs the parameters concerning the angular position, the angular velocity, and the rotation number of the rotor.

BRIEF DESCRIPTION OF DRAWINGS

These and other characteristics of the invention will be clear from the following description of a preferential form of embodiment, given as a non-restrictive example, with reference to the attached drawings wherein.

DETAILED DESCRIPTION OF THE INVENTION

Figure 1:
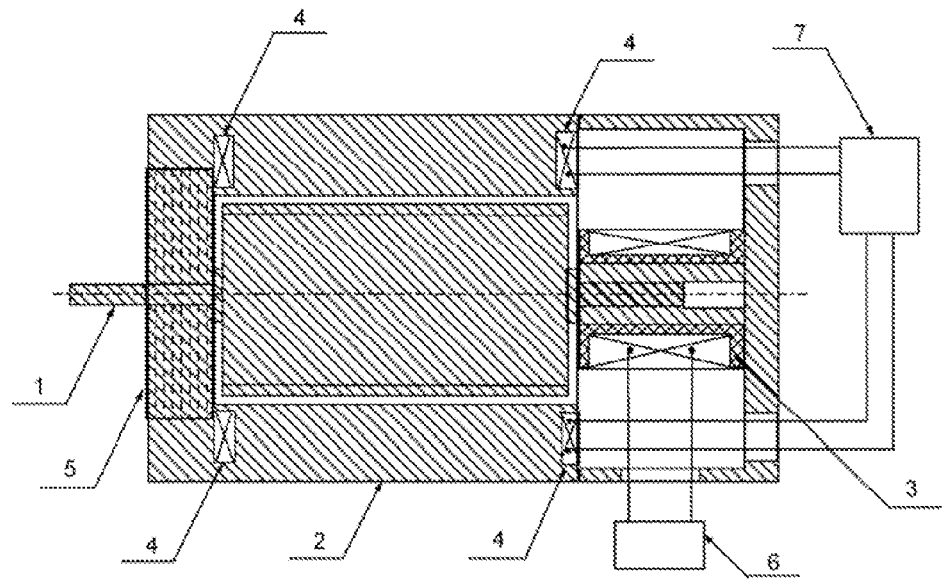
FIG. 1 is shows cross section of a structure of the present invention.
Figure 2:
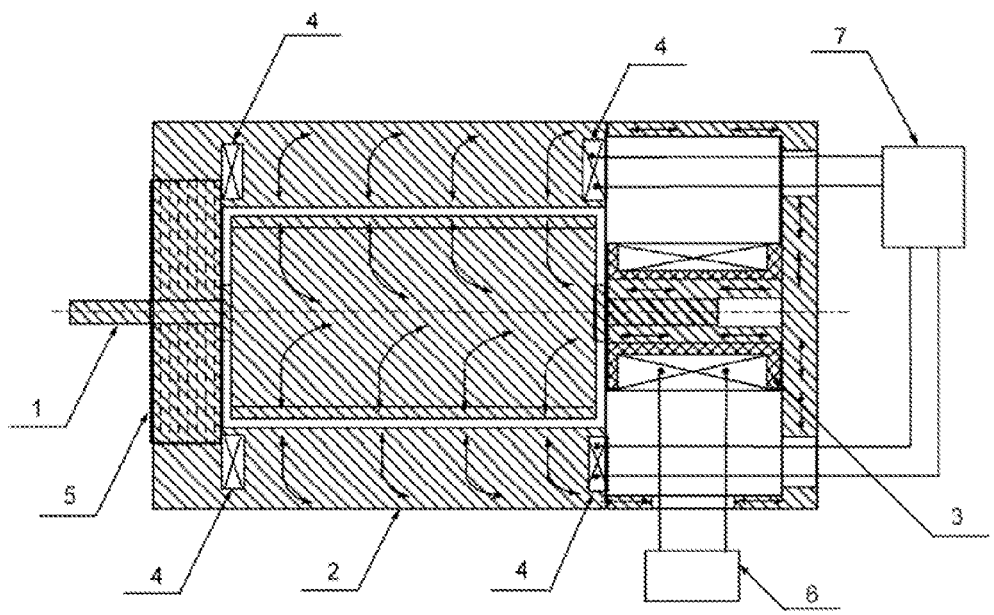
FIG. 2 is an indication of the magnetic flux within the apparatus of the present invention.
Figure 3:
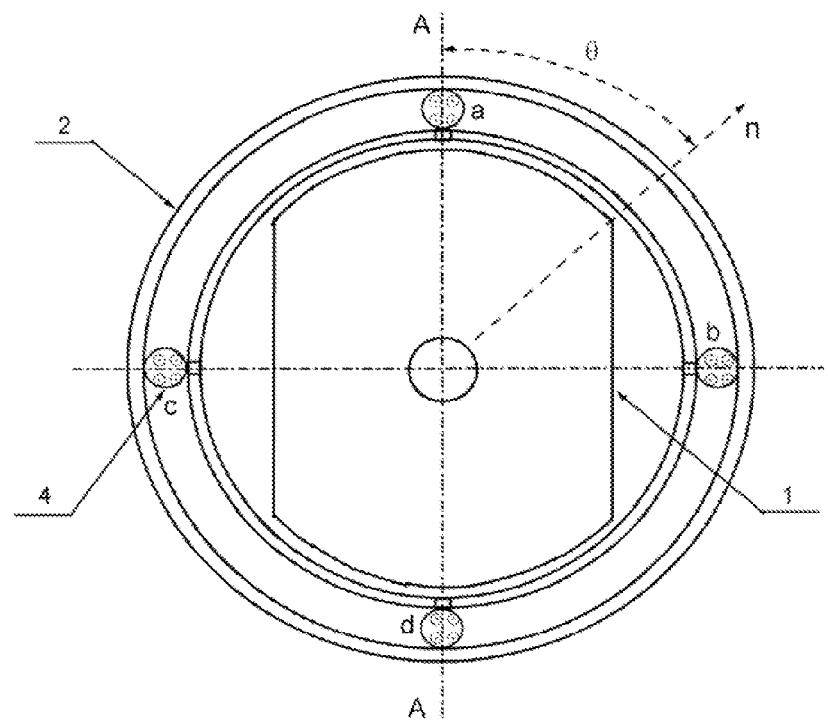
FIG. 3 is a cross section of a stator and a cam type rotor, indicating a relation of the angular position of the rotor with respect to the plane of the secondary coil winding.

A schematic diagram of the present invention, shown in FIG. 1, is a cross section of the structure of a brushless linear rotary transformer apparatus which in the present embodiment is used for determining the angular position and angular velocity of an output shaft. The apparatus includes a rotor 1, a stator 2, a primary coil winding 3, pairs of the secondary coil windings 4, a bearing 5, an excitation power supply 6, and a signal receiving and processing system 7. The primary coil winding 3 is wrapped around a hollow cylinder body on one end of the stator 2. One shaft of the rotor 2 is arranged in the hollow cylinder body. Another shaft of the rotor 1 is connected with another end of the stator 2 by the bearing 5. Pairs of the secondary coil windings 4 are embedded in the stator 2 and on the inner side of the stator 2. The planes of the secondary coil windings 4 are parallel to the axis of the rotor 1. Magnetic field parallel to the axis of the primary coil winding 3 is induced by an alternating current delivered by the excitation power supply 6. The magnetic flux is conducted across an air gap between the cam rotor 1 and the stator 2, as indicated in FIG. 2. The magnetic flux forms the circulation in the rotor 1 and the stator 2. Magnetic flux across one of pairs secondary coil windings 4 depends on the rotational position of the rotor 1 relative to the stator 2. The electromotive forces of the secondary coil windings 4 provide indications of rotational position of the rotor 1. The frequency of the electromotive force equals the frequency of the excitation current. Suppose θ is an angle of an symmetrical direction A-A of the cam rotor 1 and the normal direction of the secondary coil winding abed, as shown in FIG. 3. A width of the air gap between the stator 2 and the circular face of the rotor 1 remains a constant. Hence the magnitude of the electromotive force at the ends of the secondary winding 4 is linearly proportional to the angle θ. The electromotive force depends upon the shape of the cam rotor 1 and the number of the uniformly distributed secondary winding 4. The angular velocity of the rotor is given by a derivative of the angle θ with respect to time t, namely dθ/dt. Integrating increments in angular position of the output shaft leads to the rotation number. Parameters of angular position and angular velocity, as well as rotation number are obtained by sampling and processing electromotive forces at the ends of the secondary winding.

The relative positions of the primer and the secondary windings change with angular displacement of the rotor in prior art of devices. The magnitudes of electromotive force of the secondary winding are a sine or cosine function of angular position of the rotor. To obtain information of the angular position and angular velocity, it is necessary to design particular complex integrated circuits. The apparatus of present invention overcomes the limitations of prior art of devices. The magnitudes of electromotive force have simple relationships with angular position of the rotor. The magnitudes of electromotive forces of the secondary coil winding 4 are linearly proportional to angular position of the rotor 1.

Figure 4:
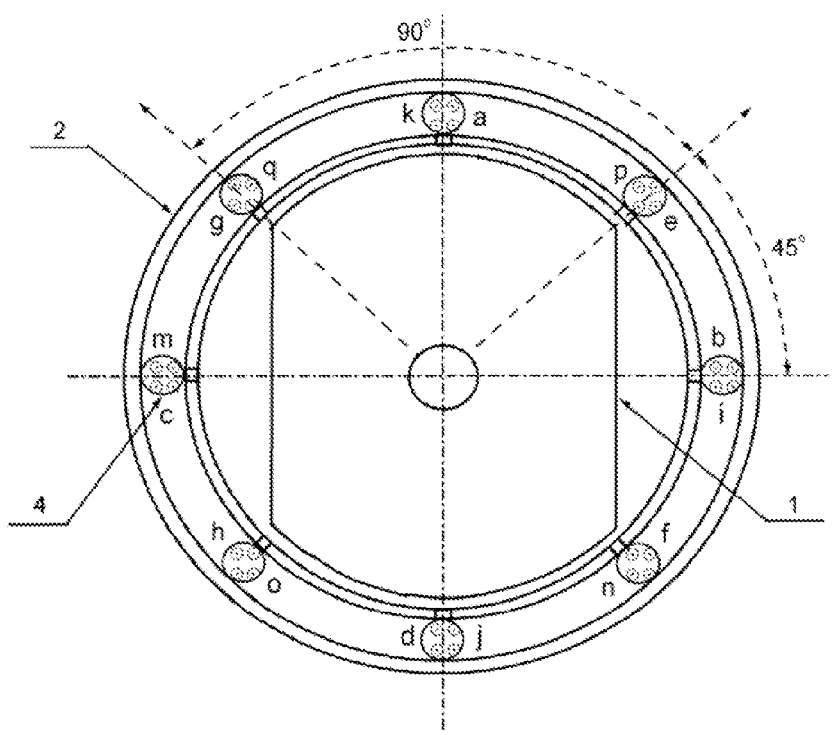
FIG. 4 is a cross section of a stator and a cam type rotor of two parallel planes, showing a relation of the angular position of the rotor with respect to the planes of four pairs of the secondary windings.

A first preferred embodiment of the present invention, shown in FIG. 4, is a cross-section of a cam type rotor 1 of two parallel planes and a stator 2, showing the relative positions of the cam type rotor 1 and four pairs of the secondary windings 4 embedded in the stator 2. A central angle of the cam type rotor 1 is 90 degrees. Four pairs of the secondary coil winding 4 are uniformly distributed on the inner side of the stator 2, and the rectangular coil planes are parallel to the axial direction of the rotor 1. A central angle for each centrally symmetrical secondary winding 4 is 90 degrees. Two adjacent secondary coil windings 4 are distributed in the staor 2 with a shift of 45 degrees in the central angle. Each rectangular coil winding is central symmetrically wrapped in the stator 2. Two adjacent rectangular secondary coil windings 4 are separated by an air gap of groove shape, which is uniformly distributed on inner side of the stator 2 and parallel to the axis of the stator 2. When the central angle of the cam type rotor 1 is coincide with the central angle of a secondary coil winding 4, the magnitude of electromotive force at the ends of the secondary coil winding 4 has maximum value. When the cam direction of the rotor (A-A direction shown in FIG. 3) is perpendicular to the plane of a rectangular secondary coil winding 4, the magnitude of electromotive force at this secondary coil winding 4 has minimum value. As shown in FIG. 4, the electromotive forces $u_1$, $u_2$, $u_3$, and $u_4$ at the ends of uniformly distributed four pairs of the secondary coil windings 4, abcd, efgh, ijkm, and nopq are described by the following equations:

$$u_1 = \begin{cases} \left(\frac{1}{2} - \frac{\theta}{\pi}\right)\sum_i u_i, & \left(0 \leq \theta \leq \frac{\pi}{2}\right) \\ \left(\frac{\theta}{\pi} - \frac{1}{2}\right)\sum_i u_i, & \left(\frac{\pi}{2} \leq \theta \leq \pi\right) \\ \left(\frac{3}{2} - \frac{\theta}{\pi}\right)\sum_i u_i, & \left(\pi \leq \theta \leq \frac{3\pi}{2}\right) \\ \left(\frac{\theta}{\pi} - \frac{3}{2}\right)\sum_i u_i, & \left(\frac{3\pi}{2} \leq \theta \leq 2\pi\right) \end{cases}$$

$$u_2 = \begin{cases} \left(\frac{1}{4} + \frac{\theta}{\pi}\right)\sum_i u_i, & \left(0 \leq \theta \leq \frac{\pi}{4}\right) \\ \left(\frac{3}{4} - \frac{\theta}{\pi}\right)\sum_i u_i, & \left(\frac{\pi}{4} \leq \theta \leq \frac{3\pi}{4}\right) \\ \left(\frac{\theta}{\pi} - \frac{3}{4}\right)\sum_i u_i, & \left(\frac{3\pi}{4} \leq \theta \leq \frac{5\pi}{4}\right) \\ \left(\frac{7}{4} - \frac{\theta}{\pi}\right)\sum_i u_i, & \left(\frac{5\pi}{4} \leq \theta \leq \frac{7\pi}{4}\right) \\ \left(\frac{\theta}{\pi} - \frac{7}{4}\right)\sum_i u_i, & \left(\frac{7\pi}{4} \leq \theta \leq 2\pi\right) \end{cases}$$

$$u_3 = \begin{cases} \frac{\theta}{\pi}\sum_i u_i, & \left(0 \leq \theta \leq \frac{\pi}{2}\right) \\ \left(1 - \frac{\theta}{\pi}\right)\sum_i u_i, & \left(\frac{\pi}{2} \leq \theta \leq \pi\right) \\ \left(\frac{\theta}{\pi} - 1\right)\sum_i u_i, & \left(\pi \leq \theta \leq \frac{3\pi}{2}\right) \\ \left(2 - \frac{\theta}{\pi}\right)\sum_i u_i, & \left(\frac{3\pi}{2} \leq \theta \leq 2\pi\right) \end{cases}$$

$$u_4 = \begin{cases} \left(\frac{1}{4} - \frac{\theta}{\pi}\right)\sum_i u_i, & \left(0 \leq \theta \leq \frac{\pi}{4}\right) \\ \left(\frac{\theta}{\pi} - \frac{1}{4}\right)\sum_i u_i, & \left(\frac{\pi}{4} \leq \theta \leq \frac{3\pi}{4}\right) \\ \left(\frac{5}{4} - \frac{\theta}{\pi}\right)\sum_i u_i, & \left(\frac{3\pi}{4} \leq \theta \leq \frac{5\pi}{4}\right) \\ \left(\frac{\theta}{\pi} - \frac{5}{4}\right)\sum_i u_i, & \left(\frac{5\pi}{4} \leq \theta \leq \frac{7\pi}{4}\right) \\ \left(\frac{9}{4} - \frac{\theta}{\pi}\right)\sum_i u_i, & \left(\frac{7\pi}{4} \leq \theta \leq 2\pi\right) \end{cases}$$

Figure 5:
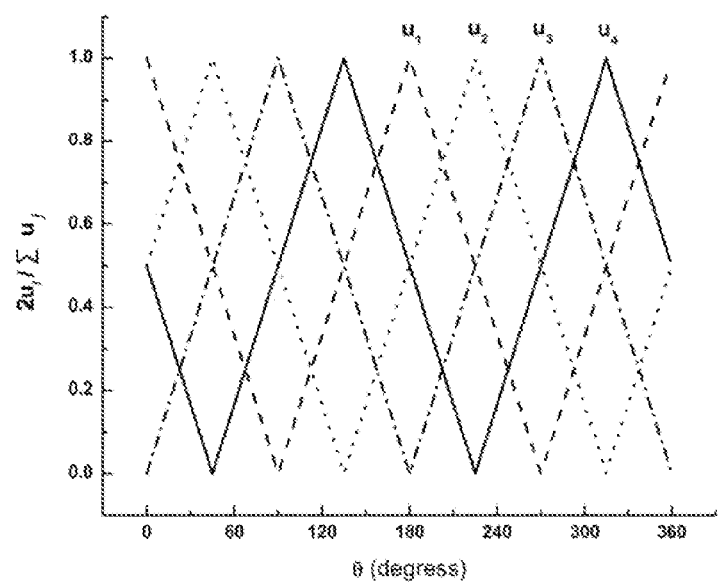
FIG. 5 shows the relations between normalized electromotive forces at four pairs of the secondary coil winding and the angular position of cam type rotor of FIG. 4.

The graphical description of the relation between normalized electromotive force and angular position are shown in FIG. 5 for four pairs of secondary coil windings 4. A sum of four electromotive forces remains a constant, which is proportional to the voltage of the excitation power supply 6. Parameters concerning the angular position and angular velocity, as well as the rotation number are obtained by determining the electromotive forces at four pairs of the secondary windings 4.

Figure 6:
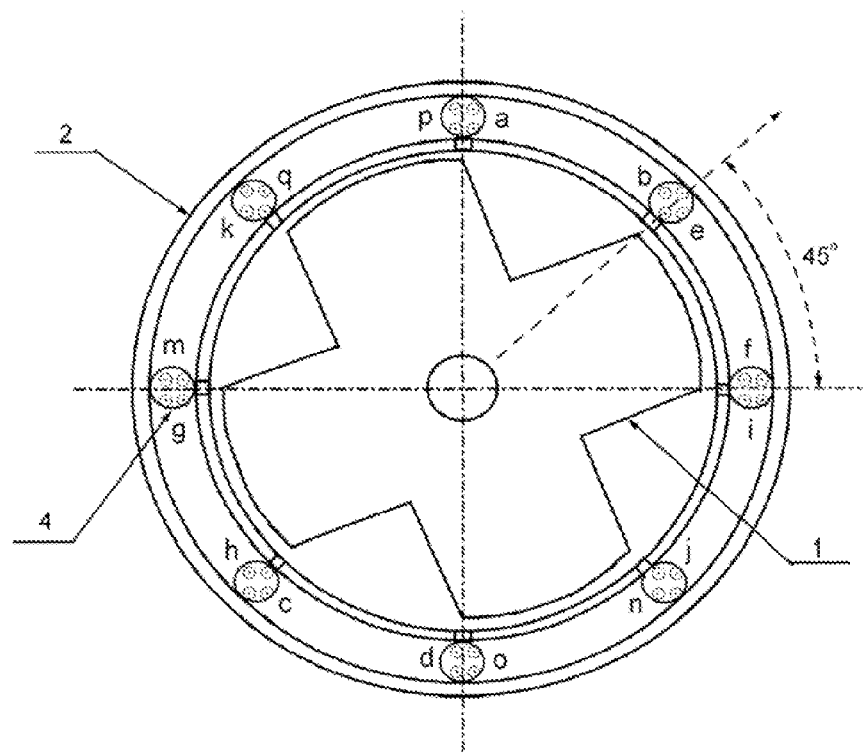
FIG. 6 shows a cross section of a stator and a cross rotor, demonstrating a relation of the angular position of the rotor with respect to the planes of four pairs of the secondary coil winding.

A second preferred embodiment of the present invention, shown in FIG. 6, is a cross-section of a stator 2 and a cross rotor 1, showing the spatial positions of the cross rotor 1 and four pairs of secondary windings 4 embedded in the stator 2. A central angle for each cross arm of the rotor 1 is 45 degrees. Four pairs of centrally symmetrical secondary coil windings 4 are uniformly distributed on the inner side of the stator 2, and the planes of the rectangular coil are parallel to the axial direction of the rotor 1. Each coil winding is central symmetrically wrapped in the stator 2. A central angle for each centrally symmetrical secondary winding 4 is 45 degrees. Two adjacent secondary coil windings 4 are distributed with a shift of 45 degrees in central angle. Two adjacent rectangular secondary coil windings 4 are separated by an air gap of groove shape, which is uniformly distributed on inner side of the stator 2 and parallel to the axis of the stator 2. The uniformly distributed four pairs of the secondary coil windings 4 are denoted by abcd, efgh, ijkm, and nopq. When the central angle of the cross rotor 1 is coincide with the central angle of a secondary coil winding 4, the magnitude of electromotive force at this coil winding has maximum value, and a minimum appears as the rotor 1 rotates 45 degrees from the position of maximum. A sum of four electromotive forces is a constant, which is proportional to the voltage of the excitation power supply 6. Parameters concerning the angular position and angular velocity, as well as the rotation number are obtained by determining the electromotive forces at four pairs of the secondary windings 4.

The invention claimed is:
1. A brushless linear rotary transformer apparatus for determining angular position and angular velocity of a rotor, said apparatus comprising:
   a rotor, wherein one shaft end of the rotor being arranged in the hollow cylinder on the end of the stator; and another shaft end of the rotor being connected with other side of the stator by a bearing;
   a stator, wherein pairs uniform hollow bars being distributed on inner side of the stator and parallel to the axis of the stator, for wrapping the coil windings; and a hollow cylinder being arranged at one end of the stator, for holding a shaft of a rotor and for wrapping a primary coil winding;

a primary coil winding wrapped around the hollow cylinder of the stator, being connected with an excitation power supply and producing an alternating magnetic field in the stator;

pairs of secondary coil windings embedded in the hollow bars distributed on inner side of the stator, being connected with a signal receiving and processing system, the electromotive forces induced at the ends of the secondary coil windings being linearly proportional to the angular position of the rotor;

a bearing, wherein the shaft of the rotor being embedded, being embedded at the end of the stator;

an excitation power supply connected with the primary coil winding, being able to supply an alternating current through the primary coil winding; and a signal receiving and processing system, being connected with secondary coil windings, being able to sample and process the electromotive forces induced at the ends of the secondary coil windings, and output the parameters concerning the angular position, the angular velocity, and the rotation number of the rotor.

2. The apparatus of claim 1, wherein the rotor is in a shape of an axially symmetrical cam with two parallel planes, or in an axially symmetrical shape of multiple gears.

3. The apparatus of claim 1, wherein two or more rectangular secondary coil windings are uniformly embedded in the stator and on the inner side of the stator; two adjacent rectangular secondary windings are separated by an uniform air gap, the groove shape air gaps are uniformly distributed on inner side of the stator and parallel to the axis of the stator.

4. The apparatus of claim 1, wherein the rotor and the stator consist of ferromagnetic or ferrite material.

5. The apparatus of claim 1, wherein one ends of rotor and the stator are connected by the bearing consisting of non ferromagnetic material, and are magnetically separated with large reluctance.

6. The apparatus of claim 1, wherein the excitation power supply is either a power supply which delivers an alternating current at 50 or 60 Hz, or a power supply which delivers an alternating current generated inversely from a direct current.

* * * * *